United States Patent [19]

Ruf et al.

[11] Patent Number: 4,776,307

[45] Date of Patent: Oct. 11, 1988

[54] MULTI-CYLINDER/COMBUSTION ENGINE

[75] Inventors: Max Ruf, Obereisesheim; Erwin Korostenbski, Oedheim, both of Fed. Rep. of Germany

[73] Assignee: Audi AG, Ingolstadt, Fed. Rep. of Germany

[21] Appl. No.: 86,915

[22] Filed: Aug. 19, 1987

[30] Foreign Application Priority Data

Sep. 6, 1986 [DE] Fed. Rep. of Germany ....... 3630466

[51] Int. Cl.$^4$ .............................. F01L 1/04; F01L 1/02
[52] U.S. Cl. .................................................. 123/90.31
[58] Field of Search ............... 123/90.27, 90.31, 90.15; 474/87

[56] References Cited

U.S. PATENT DOCUMENTS

| | | | |
|---|---|---|---|
| 2,718,790 | 9/1955 | Hughey | 123/90.31 X |
| 3,673,990 | 7/1972 | Alfieri | 123/90.31 X |
| 3,945,262 | 3/1976 | Griffin | 474/87 X |
| 4,438,735 | 3/1984 | Burandt | 123/90.31 X |
| 4,530,318 | 7/1985 | Semple | 123/90.31 X |
| 4,607,601 | 8/1986 | Kohler | 123/90.31 |

*Primary Examiner*—Willis R. Wolfe
*Attorney, Agent, or Firm*—Kane, Dalsimer, Sullivan, Kurucz, Levy, Eisele and Richard

[57] ABSTRACT

On a multi-cylinder combustion engine with two overhead camshafts 7, 8, sprocket wheels 9 and 10 are mounted on the camshafts between adjacent cams in such a way that they are engaged by a drive chain 12 in opposite directions with an arc of contact exceeding 90°. The chain 12 is driven by a drive sprocket 13 which is connected to a gear 14, which in turn is engaged with gear teeth 15 on the crankshaft 3. The non-driving strand of chain 12 is guided above sprocket wheel 9 by a curved guide rail 16, which is also designed to serve as a chain tensioner.

3 Claims, 1 Drawing Sheet

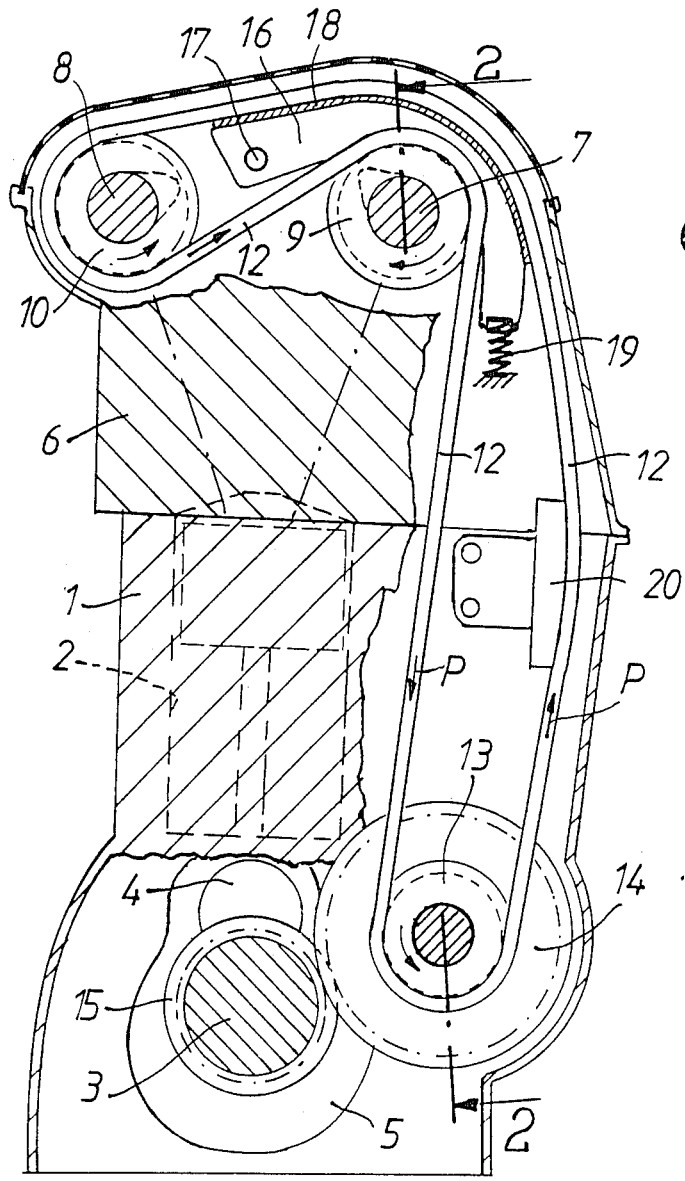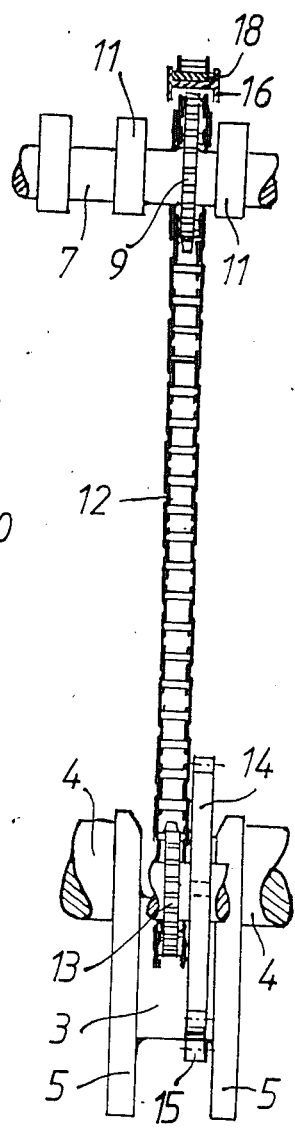

MULTI-CYLINDER/COMBUSTION ENGINE

The invention refers to a multi-cylinder combustion engine as referred to in the preamble to claim 1.

A combustion engine of this kind is described for example in the book by A. Hütten "Schnelle Motoren seziert und frisiert" (High Performance engines analysed and tuned), 7th Edition, Page 447. In this known type of combustion engine, the inside of the chain that drives the two camshafts passes over the two sprocket wheels located on the camshafts and then over an idler sprocket located in the cylinder head near the first sprocket wheel, and then back to the drive sprocket. A disadvantage of this known camshaft drive arrangement is that, for the chain an idler sprocket is required and that, due to the restricted space, it is very difficult to provide and accommodate the bearings for such idler sprocket and that the arc of contact between the chain and the sprocket wheel nearest the drive sprocket is considerably less than 90°, so that there is a danger of the chain jumping over the sprocket wheel, and in addition the dimensions of the chain and sprocket wheels have to be designed to give sufficient strength to transmit the necessary driving force in spite of the small arc of contact.

The purpose of the invention is to devise a multi-cylinder combustion engine as referred to in the preamble of claim 1, in which the drive mechanism for the two camshafts is less complex and more reliable. The invention achieves this purpose by means of the characteristic features specified in claim 1.

In a practical application, the design proposed by the invention achieves an arc of contact of more than 120° for the sprocket wheel nearest to the drive sprocket, which prevents any risk of the chain jumping and considerably reduces the loading on this sprocket wheel and on the chain. The proposed routing of the chain eliminates the need for an idler sprocket, and only requires a guide for the non-driving strand of the chain to take it round the sprocket wheel nearest to the drive sprocket; this guide requires little space and at the same time can be designed as a chain tensioner.

Further desirable refinements to the invention are outlined in the subsidiary claims.

An example of a practical application of the invention is described below, with reference to the drawings:

FIG. 1 shows a cross-section of a combustion engine in the area of the camshaft drive mechanism.

FIG. 2 shows the longitudinal sectional view along line 2—2 in FIG. 1, showing only the camshaft drive mechanism.

The multi-cylinder combustion engine illustrated in FIG. 1 comprises a crankcase 1 including several cylinder bores 2 and supporing a crankshaft 3 with journals 4 and webs 5. A cylinder head 6 is mounted on crankcase 1 and accommodates two camshafts 7 and 8 to operate intake and exhaust valves (not illustrted). Each camshaft 7, 8 carries a sprocket wheel 9, 10 which is located between adjacent cams 11, as shown in FIG. 2 for camshaft 7. The two sprocket wheels 9 and 10 are driven via a chain 12 by a drive sprocket 13 which is rigidly coupled to a gear 14, which in turn is in engagement with gear teeth 15 on crankshaft 3 between adjacent crankwebs 5.

The direction of motion of chain 12 is indicated by the arrows P. As the illustration shows, the chain 12 is routed so that it engages round the first sprocket wheel 9 in a clockwise direction and the second sprocket wheel 10 in an anti-clockwise direction and so that the non-driving or slack strand of the chain 12 is guided round the first sprocket wheel 9 by means of a curved guide rail 16. Routing the chain in this way achieves a large arc of contact for the two sprocket wheels 9 and 10.

The curved guide rail 16 is also designed as a chain tensioner and is pivoted at the front on a bearing 17 in cylinder head 6. The guide rail is provided with a contact surface 18 for chain 12, and is pressed upwards by a spring 19. This spring can be relatively weak because, with guide rail 16 pivoted at the front, the direction of the tensioning force is the same as the direction of motion of the chain, thus giving a servo effect.

A fixed guide 20 can be provided to prevent vibration in the slack strand of the chain 12.

We claim:
1. Multi-cylinder internal combustion engine with
   (a) a crankshaft (3) running in bearings in a crankcase (1),
   (b) a cylinder head (6) mounted on the crankcase,
   (c) two camshafts (7, 8), running in bearings in the cylinder head (6) and each carrying a sprocket wheel (9 and 10) in their center portion,
   (d) a drive sprocket (13), whose axis of rotation is parallel to that of the crankshaft and located to the side of the crankshaft, and which is driven by the crankshaft (3), and
   (e) a chain (12), which runs from the drive sprocket (13) on one side of the crankcase (1) to the two sprocket wheels (9, 10) and is taken back to the drive sprocket (13) on the same side of the crankcase, characterised in that the chain (12) runs round one sprocket wheel (9) in a clockwise direction and round one sprocket wheel (10) in an anti-clockwise direction, with the arc of contact exceeding 90° in each case.

2. Multi-cylinder combustion engine in accordance with claim 1, characterised in that the chain (12) has a slack strand which runs between the drive sprocket (13) and the sprocket wheel (10) which is furthest from the drive sprocket, and that the inside of the chain is guided around the nearer sprocket wheel (9) by means of a guide (16), which also serves as a chain tensioner.

3. Multi-cylinder combustion engine in accordance with claim 2, characterised in that the guide (16) forming the curved chain tensioner (16) is pivoted at its front end (in relation to the direction of movement of the slack strand of the chain (12)), and is spring-loaded by a spring (19) in such a way that the chain tensioner (16) tends to pivot outwards.

* * * * *